United States Patent Office 3,203,909
Patented Aug. 31, 1965

3,203,909
POLYMERIC BORON-BORON BONDED
COMPOUNDS
Robert J. Brotherton and Howard Steinberg, Fullerton,
Calif., assignors to United States Borax & Chemical
Corporation, Los Angeles, Calif., a corporation of
Nevada
No Drawing. Filed Mar. 20, 1962, Ser. No. 181,178
8 Claims. (Cl. 260—2)

The present invention relates as indicated to a new group of polymeric boron-boron bonded compounds, and has further reference to a method for preparing these polymeric compounds.

It is, therefore, the principal object of the present invention to provide as new compositions, polymeric boron-boron bonded compounds.

It is a further object of this invention to provide an efficient and economically desirable method for preparing these new polymeric boron-boron bonded compounds.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises polymeric boron-boron bonded compounds having the recurring structural unit

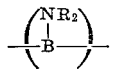

where R is an alkyl radical of from 1 to 6 carbon atoms.

The present polymeric compounds are soluble in hydrocarbon solvents and are useful as antioxidants in lubricating oils and as anti-knock agents in gasoline. Additionally these compounds have utility as bacteriostatic agents, and they are potent reducing agents which find use in a number of chemical processes, such as in chemical plating. The present compounds, having a high boron content, are also of further interest for use as binding agents in the preparation of solid chemical propellants.

The preparation of the present polymeric boron-boron bonded compounds can best be illustrated by the following equation:

where R is an alkyl radical of from 1 to 6 carbon atoms, X is either chlorine or bromine, and M is either an alkali metal, sodium-potassium alloy, or sodium amalgam, and where $n$ is an integer greater than 1.

The preferred method for performing the above reaction is to slowly add a dihalo(dialkylamino)borane to one of the defined reducing metals having a continuously available active surface. The reaction mass is then heated for a short period of time to be sure of complete reaction, and the solid reaction by-product, the alkali metal halide, is removed from resultant reaction mass. The remaining solution is then subjected to a series of distillations to remove all the solvent and any reaction by-products, and the desired polymeric boron-boron bonded compound is recovered from the reaction vessel.

It will be noted in the foregoing paragraph that the reducing metal, the alkali metal, sodium-potassium alloy, or sodium amalgam, is specifically described as having a continuously available active surface. This is of utmost importance in order for the reaction to proceed rapidly, and to obtain high yields of product. To have a continuously available active surface the metal must be either dispersed in a very small particle size, or in a liquid or molten state. In other words it is necessary to have the metal in such a physical condition where it continuously presents a maximum surface area for reaction with the dihalo(dialkylamino)borane.

As regards the dihalo(dialkylamino)boranes applicable to the present invention, these compounds have the formula $(R_2N)BX_2$ where R is an alkyl radical of from 1 to 6 carbon atoms, and X is a halogen having an atomic number of from 17 to 35. These compounds are well known in the art and can be prepared by the reaction of equimolar proportions of a corresponding dialkylamine with an appropriate boron trihalide and the addition of a trialkylamine. They can also be prepared by the reaction of a tris(dialkylamino)borane with a boron trihalide in a 1:2 molar ratio.

The following list is illustrative of the dihalo(dialkylamino)boranes applicable to the present invention:

Dichloro(dimethylamno)borane
Dibromo(dimethylamino)borane
Dichloro(diethylamino)borane
Dibromo(di-n-propylamino)borane
Dichloro(diisopropylamino)borane
Dichloro(di-n-butylamino)borane
Dibromo(diisoamylamino)borane
Dichloro(di-n-hexylamino)borane
Dibromo(diisobutylamino)borane
Dibromo(di-n-amylamino)borane It is to be clearly understood that the foregoing list is only a partial enumeration of the dihalo(dialkylamino) boranes applicable to the present invention and is not intended to limit the invention.

So that the present invention is more clearly understood, the following examples are given for illustrative purposes:

I. A solution of 57.0 grams (0.453 mole) of dichloro-(dimethylamino)borane in 50 ml. of xylene was added to a vigorously stirred mixture of 22.93 grams (0.997 mole) of molten sodium in 350 ml. of xylene at a temperature of about 110° C. over a 30 minute time interval. An immediate exothermic reaction took place and on completion of the addition the reaction mass was heated for 3 hours at about 110° C. to about 120° C. with continued stirring. The resultant slurry was then filtered to remove the sodium chloride reaction product (98% of theory) and the excess sodium. The filtrate was then distilled at reduced pressure to remove the xylene and a viscous brown residue remained. Further distillation of the residue in a molecular still resulted in the removal of more solvent and a small amount of other volatile materials. A solid, tan polymeric material, about 13.25 grams, was then recovered from the reaction vessel. The polymeric compound was benzene soluble, and had a molecular weight of from about 1200 to 1400. Chemical analysis of the product yielded the following data.

Calculated for $C_2H_6BN$: $B=19.74\%$. Found in product: $B=20.36\%$.

II. Example I was repeated except that dibromo (dimethylamino)borane was substituted for the dichloro-(dimethylamino)borane. The resultant product had the same properties and characteristics as the product from Example I.

III. A solution of 66.47 grams (0.432 mole) of dichloro(diethylamino)borane in 75 ml. of toluene was added to a vigorously stirred mixture of 33.82 grams (0.865 mole) of molten potassium in 400 ml. of toluene at about 100° C. over a 30 minute period. An immediate exothermic reaction took place and after the addition was completed the reaction mass was heated with continued stirring for about 4 hours at from about 100° C. to about 110° C. The resultant slurry was then filtered and the potassium chloride (96% of theory) was removed. The filtrate was then distilled at reduced pressure to remove the toluene and a viscous greenish-brown residue remained. Further distillation of the residue in a molecular still resulted in the removal of more solvent and a small amount of other volatile materials. A solid, brown polymeric material, about 20.5 grams, was then recovered from the reaction vessel. The polymeric compound was benzene soluble, and had a molecular weight of from about 1250 to 1400. Chemical analysis of the polymeric product resulted in the following data.

Calculated for $C_4H_{10}BN$: B=13.04%. Found in product: B=13.31%.

IV. Example III was repeated except that sodium amalgam was substituted for potassium as a reactant. The results of this example were essentially the same as those for Example III.

V. A solution of dichloro(di-n-propylamino)borane, 57.12 grams (0.314 mole) in 50 ml. of petroleum ether was added to a vigorously stirred sodium-potassium alloy, 21.25 grams (0.210 mole Na:0.420 mole K), in 350 ml. of petroleum ether at ambient temperature over a 30 minute time interval. An immediate exothermic reaction took place, and after the addition was completed the reaction mass was heated with continued stirring for about 3 hours at from about 50° C. to 65° C. The resultant slurry was then filtered and the sodium and potassium chloride mixture containing about 96% of the theoretical chloride content was removed. The filtrate was then distilled at reduced pressure to remove the ether and a colorless, viscous residue remained. Further distillation of the residue in a molecular still resulted in the removal of more solvent and a small amount of other volatile materials. A solid, white polymeric material, about 18.0 grams, was then recovered from the reaction vessel. The polymeric compound was benzene soluble, and had a molecular weight of from about 1300 to 1500. Chemical analysis of the polymeric product yielded the following data.

Calculated for $C_6H_{14}BN$: B=9.75%. Found in product: B=10.07%.

Other modes of applying the principle of the invention may be employed, change being made as regards the details described, provided the features stated in any of the following claims or the equivalent of such be employed.

We, therefore, particularly point out and distinctly claim as our invention:

1. Solid, polymeric boron-boron bonded compounds consisting of the recurring structural unit

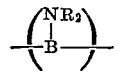

where R is an alkyl radical of from 1 to 6 carbon atoms.

2. A solid polymeric boron-boron bonded compound consisting of the recurring structural unit

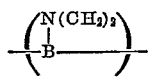

3. A solid polymeric boron-boron bonded compound consisting of the recurring structural unit

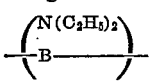

4. A solid polymeric boron-boron bonded compound consisting of the recurring structural unit

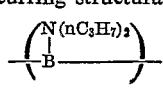

5. The method for producing solid polymeric boron-boron bonded compounds consisting of the recurring structural unit

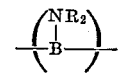

which comprises slowly adding a dihalo(dialkylamino)-borane, having the formula $(R_2N)BX_2$ to a metal having a continuously available active surface, said metal selected from the group consisting of the alkali metals, sodium-potassium alloys and sodium amalgam, removing the metal halide reaction by-product from the reaction mass, and recovering said polymeric boron-boron bonded compound from the resultant solution, where R is an alkyl radical of from 1 to 6 carbon atoms, and X is a halogen having an atomic number from 17 to 35.

6. The method for producing solid polymeric boron-boron bonded compounds consisting of the recurring structural unit

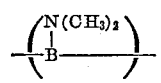

which comprises slowly adding a compound selected from the group consisting of dichloro(dimethylamino)borane and dibromo(dimethylamino)borane to a metal having a continuously available active surface, said metal selected from the group consisting of the alkali metals, sodium-potassium alloys and sodium amalgam, removing the metal halide reaction by-product from the reaction mass, and recovering said polymeric boron-boron bonded compound from the resultant solution.

7. The method for producing solid polymeric boron-boron bonded compounds consisting of the recurring structural unit

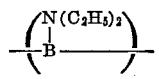

which comprises slowly adding a compound selected from the group consisting of dichloro(diethylamino)borane and dibromo(diethylamino)borane to a metal having a continuously available active surface said metal selected from the group consisting of the alkali metals, sodium-potassium alloys and sodium amalgam, removing the metal halide reaction product from the reaction mass, and recovering said polymeric boron-boron bonded compound from the resultant solution.

8. The method for producing solid polymeric boron-boron bonded compounds consisting of the recurring structural unit

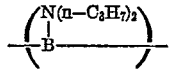

which comprises slowly adding a compound selected from the group consisting of dichloro(di-n-propylamino)borane and dibromo(di-n-propylamino)borane to a metal having a continuously available active surface, said metal selected from the group consisting of the alkali metals, sodium-potassium alloys, and sodium amalgam, removing the metal halide reaction product from the reaction mass, and recovering said polymeric boron-boron bonded compound from the resultant solution.

References Cited by the Examiner

UNITED STATES PATENTS 3,052,641   9/62   McCloskey et al. _____ 260—2
3,068,182   12/62   English et al. _____ 260—2

OTHER REFERENCES

McCloskey: Boron Polymers, an abstract from Inorganic Polymers, Stone, Academic Press, New York, 1962.

WILLIAM H. SHORT, *Primary Examiner.*

J. R. LIBERMAN, *Examiner.*